Nov. 20, 1923.
J. S. PARENTI
MOTOR VEHICLE
Filed Sept. 8, 1920
1,475,138
3 Sheets-Sheet 1
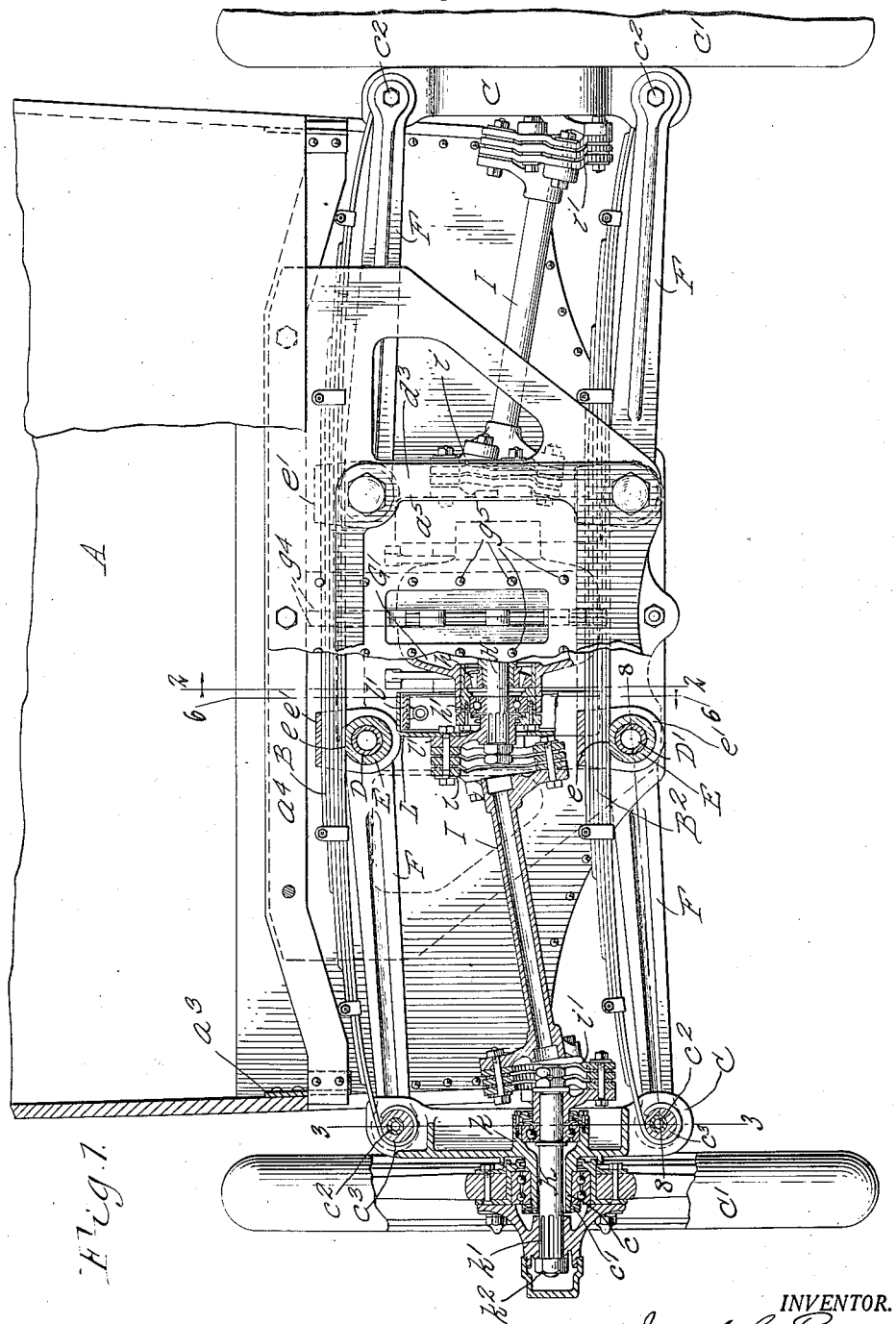
INVENTOR.
Joseph S. Parenti
BY Parker & Brockwood
ATTORNEYS.

Nov. 20, 1923.
J. S. PARENTI
MOTOR VEHICLE
Filed Sept. 8, 1920
1,475,138
3 Sheets-Sheet 2
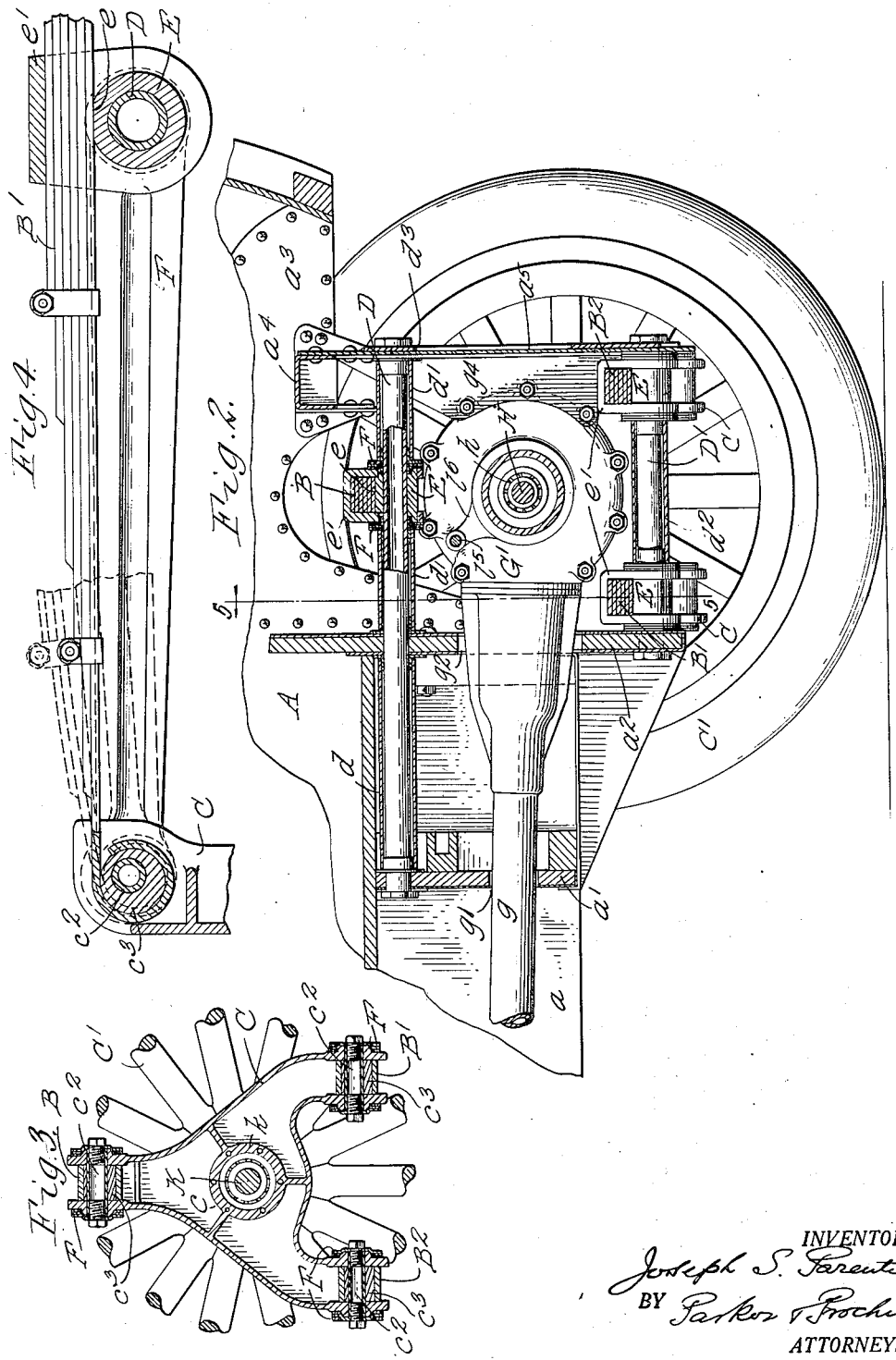
INVENTOR.
Joseph S. Parenti
BY Parker & Prochnow
ATTORNEYS.

Nov. 20, 1923.  
J. S. PARENTI  
MOTOR VEHICLE  
Filed Sept. 8, 1920  
1,475,138  
3 Sheets-Sheet 3
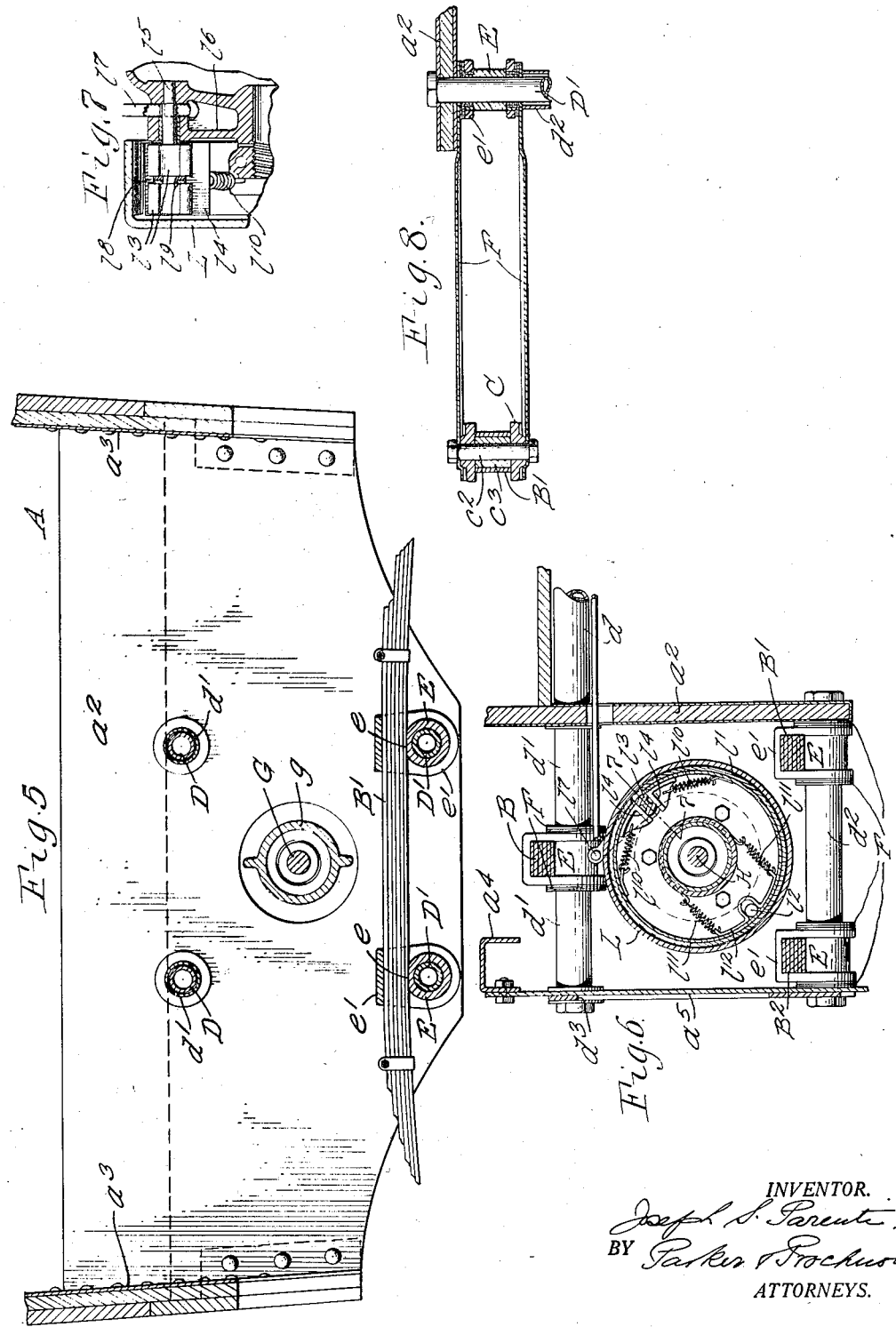
INVENTOR.  
Joseph S. Parenti  
BY Parker & Brocknow  
ATTORNEYS.

Patented Nov. 20, 1923.

1,475,138

UNITED STATES PATENT OFFICE.

JOSEPH S. PARENTI, OF BUFFALO, NEW YORK, ASSIGNOR TO PARENTI MOTORS CORPORATION, OF BUFFALO, NEW YORK.

MOTOR VEHICLE.

Application filed September 8, 1920. Serial No. 408,902.

*To all whom it may concern:*

Be it known that I, JOSEPH S. PARENTI, a citizen of the United States, residing at Buffalo, in the county of Erie and State of New York, have invented a new and useful Improvement in Motor Vehicles, of which the following is a specification.

This invention relates to improvements in motor vehicles and more particularly to improvements in the operating connections between the motor and brake-actuating means and the driving wheels of the vehicle, and in the means for supporting the vehicle from the driving wheels.

The main object of this invention is to provide a motor vehicle in which the parts are so constructed as to reduce to the minimum the weight of those parts of the vehicle which are not supported by the springs. With this object in view, the differential and brakes of the vehicle are mounted on the body of the vehicle in such a manner that the weight of the differential and brakes is supported by the vehicle springs. Other objects of the invention are to provide the vehicle with brakes of improved construction; also to provide means of improved construction for supporting the body of the vehicle from the driving wheels thereof; also to improve the construction of motor vehicles in other respects hereinafter specified.

In the accompanying drawings:

Fig. 1 is a rear elevation, partly in section of the lower portion of a motor vehicle embodying the invention.

Fig. 2 is a longitudinal sectional elevation thereof on line 2—2, Fig. 1.

Fig. 3 is a fragmentary longitudinal sectional elevation thereof on line 3—3, Fig. 1.

Fig. 4 is a fragmentary end elevation thereof on an enlarged scale, partly in section, showing means for connecting a wheel carrier with the body of the vehicle.

Fig. 5 is a transverse sectional elevation thereof on line 5—5, Fig. 2.

Fig. 6 is a fragmentary longitudinal sectional elevation thereof on line 6—6, Fig 1.

Fig. 7 is a fragmentary section on an enlarged scale on line 7—7, Fig. 6.

Fig. 8 is a fragmentary top plan view, partly in section, of the means for connecting a wheel carrier with the body of the vehicle.

A represents the body of the vehicle, which may be of any usual or suitable construction, the body shown in the drawings including two side or truss members $a$ extending lengthwise of the vehicle, and transverse members $a'$ and $a^2$ which are rigidly secured to the truss members of the body. The body also includes two rearwardly extending plates $a^3$ which are suitably secured to the truss members $a$ and to the transverse member $a^2$, and which support the rear end of the body. These rearwardly extending plates are preferably connected by means of a transverse beam or member $a^4$, which in the construction shown is of inverted U-shape, and a transverse plate or carrying member $a^5$ is preferably bolted or otherwise secured to the rear flange of the beam $a^4$ and hangs downwardly therefrom.

The body is preferably supported from the rear or driving wheels of the vehicle by means of a plurality of transversely extending springs, three springs B, B' and B$^2$ being shown in the drawings. These springs connect at their outer ends with wheel supports or brackets C on which the rear or driving wheels C' of the vehicle are mounted. In the construction shown, each wheel carrier is provided with a hollow stud portion $c$, Fig. 1, projecting outwardly from the wheel carrier and on which the wheel is journalled in any suitable manner. A nut $c'$ or the like holds the wheel on the stud $c$. Each wheel carrier is preferably provided with suitable pins or bolts $c^2$ on which eccentric bushings $c^3$ are journalled, and the ends of the springs are connected with the eccentric bushings in such a manner that the bushings are free to turn relatively to the springs and to the pivots $c^2$. The springs are preferably so arranged relatively to the wheels that one of the springs, for example the spring B, is substantially in the vertical plane of the axis of the wheel and above this axis, and the other two springs B' and B$^2$ are arranged below the center of the wheels and one of the springs is arranged in front of, and the other in rear of a vertical plane passing through the axes of the wheels.

The springs may be secured to the body of the vehicle in any desired manner. In the construction shown, the upper spring B is secured to a pair of tubular spring supporting members or rods D D, which extend through and are secured to the transverse members $a'$ and $a^2$ of the frame and the rear transverse plate or carrying member $a^5$. The two lower springs $B'$ $B^2$ are secured to a pair of spring supporting members $D'$ $D'$ corresponding to the members D D and extending through and secured to the transverse plate $a^2$ and the carrying member or plate $a^5$. The spring supporting members D, $D'$, $D'$ in addition to forming a connection between the vehicle and the springs, also secure the transverse members of the frame in proper relation to each other and reinforce the rear end of the frame. The spring supporting members D D preferably extend through spacing tubes $d$ which are arranged between the transverse frame members $a'$ and $a^2$, and spacing tubes $d'$ which determine the position of the spring B with reference to the transverse frame members $a^2$ and the plate $a^5$. The spring supporting members $D'$ $D'$ extend through spacing tubes $d^2$ which position the springs $B'$ $B^2$ on the spring supporting members. The rear ends of the spring supporting members are preferably all connected by means of a reinforcing plate $d^3$ through which the ends of the spring supporting members extend and which, as shown, is in the form of a hollow square, the spring supporting members extending through the corner portions thereof.

The springs may be secured to the spring supporting members by any suitable means, the construction described in my copending application No. 406,687, filed August 28, 1920, being preferably employed, which includes sleeves or bushings E rotatably mounted on the spring supporting members and having flat faces $e$ against which the springs are held by means of shackles or straps $e'$, having depending legs or parts through which the sleeves E extend. By means of this construction the springs are free to move in the direction of their length relatively to the sleeves E and the body of the vehicle. The arrangement of the springs and their connections with the body and wheel carriers is such that the springs alone under normal conditions would support the wheels and wheel carriers, but when the vehicle is subjected to lateral stresses, such for example as occur when the vehicle is making a turn, the wheels bend the springs and thus assume angular positions, which is objectionable. I, therefore, connect the wheel carriers with non-load carrying parts which serve to prevent the wheels from assuming decidedly angular positions and which parts add very little to the unsprung weight of the car. In the particular embodiment of the invention shown, the wheel carriers are preferably held in definite, angular relations to the body of the vehicle by spacing or distance members or links F, similar to those described in the hereinbefore mentioned application. These spacing members connect each spring supporting member D or $D'$ with the corresponding pin or bolt $c^2$ of the adjacent wheel carrier, so that the spacing members form with the wheel carriers and the body, parallel link mechanisms and thus maintain the wheel carriers in definite angular relations to the body, independently of the springs. The spring construction described has the advantages that the arrangement of the springs one above the other as shown, and their connection with the wheel carriers C is such that the springs alone under normal conditions tend to hold the wheels in correct relation to the body so that under such normal conditions, no axle or connection with the wheel carriers and body is needed. Consequently, in order to hold the wheels in correct relation to the body when subjected to a side thrust, or under other special conditions, a relatively light structure can be employed, the usual heavy load-carrying axle being omitted, thus reducing the unsprung weight of the car. While spacing members of the kind described are preferably employed to hold the wheel carriers in correct relation to the car, yet it is not intended to limit the invention to such spacing members, since other means engaging the wheel carriers to hold the same against moving out of substantially upright positions may be employed in connection with the spring arrangement described without departing from this invention. As the springs are deflected, any changes in the length of the springs with reference to the spacing members, due to straightening or arching of the springs during the deflections thereof, is compensated for by means of the eccentrics $c^3$. The arrangement of the springs described results in a two fold action of each spring, since deflections of the ends of the spring causes corresponding deflections of the portion of the spring arranged between the two spring supporting members. By means of the arrangement of the parts described, the usual rigid connection between the rear wheels, such as an axle or axle housing, is entirely eliminated, thus eliminating the weight of this member, which weight in vehicles as usually constructed cannot be supported by the springs. Furthermore, each wheel in the construction described, acts independently of the other wheel, so that the riding qualities of the vehicle are greatly improved.

The vehicle is provided with a suitable source of power, not shown, which is connected with a main driving shaft G arranged in a housing $g$ extending lengthwise of the vehicle. The rear end of the driving shaft is connected with the usual differential gear arranged in a housing G' which is rigidly secured on the body of the vehicle. The driving shaft and housing therefore extend through holes $g'$ and $g^2$ formed in the transverse frame members $a'$ $a^2$. The differential gear housing may be secured to the body of the vehicle in any desired manner, for example, a pair of plates $g^4$, Fig. 2, may be secured to the rear, transverse plate $a^5$, as by means of rivets, $g^5$, Fig. 1. The plates $g^4$ extend forwardly from the plate $a^5$, and the front edges of these plates are secured to the differential housing preferably by means of the bolts which secure together the two parts of the housing G'. By securing the differential on the vehicle body, relative movement between the differential and motor is practically eliminated, and the weight of the differential and the rear end of the driving shaft is supported by the springs and not directly from the wheels, as in vehicles now commonly used. The differential gear may be of any usual or suitable construction and is not shown in detail in the accompanying drawings.

Any desired driving connection may be employed between the differential and the rear or driving wheels, which will permit the wheels to move relatively to the differential. In the construction shown for this purpose, the differential gear housing G is provided at opposite sides with extensions in each of which a short shaft H is journalled, suitable bearings $h$ and $h'$, being provided for this purpose which are secured in the extension of the differential gear housing. Each shaft H is connected with a shaft I by means of a universal joint or coupling $i$ of any desired construction, and the outer end of each shaft I is connected by means of another universal joint or coupling $i'$ to a wheel shaft K. This shaft K is journalled at its inner end in an extension or part $k$ of the wheel carrier and the outer end of the shaft has a driving connection with the wheel C' as shown at $k'$ and is secured to the wheel by a nut $k^2$. By means of this arrangement the wheels can freely move up and down relatively to the differential gear without in any way interferring with the transmission of power to the wheels.

In order to further reduce the weight of those parts of the vehicle which are not supported by the springs, the brakes of the vehicle are arranged on the body of the vehicle, preferably in immediate proximity to the differential gear housing. In the construction shown, a brake drum L is arranged on each shaft H, preferably on a spider $l$ secured to the shaft and forming a part of the universal joint $i$. Within the drum an expansible member or split ring $l'$ is arranged which has a slidable connection with a stud $l^2$ suitably secured on a fixed part of the vehicle body. The split ring may be expanded by means of a cam $l^3$ arranged between brackets $l^4$ secured to the ends of the split expansion ring $l'$. This cam in the construction shown is rotatably mounted on a stud $l^5$, Fig. 7, secured on the differential housing and a bracket or part $l^6$ extending outwardly from the differential housing. The expansion cam is preferably mounted on a hollow shaft or sleeve into which the stud $l^5$ extends and on which a brake arm or lever $l^7$ is mounted, which is connected with the usual brake-operating mechanism (not shown) of the vehicle. The expansion cam is preferably split or formed in two parts, thus providing a space $l^8$ between the two parts of the cam. This space is occupied by a pair of plates $l^9$ engaging the shaft of the expansion cams and extending in opposite directions therefrom. Springs $l^{10}$ are secured at their opposite ends to the plates $l^9$ and the expansible ring $l'$, thus holding the brackets $l^4$ in engagement with the expansion cam and withdrawing the expansible ring out of contact with the brake drum. Springs $l^{11}$ secured to a band $l^{12}$ extending around the laterally projecting part of the differential housing further help to keep the expansible ring out of engagement with the brake drum. Other means for supporting the brakes from the vehicle body or differential housing may be employed if desired.

The arrangement of the rear springs of the vehicle as described has the advantage of resisting to the best advantage, the strains to which the springs of the vehicle are subjected, due to the transmission of power to the wheels, to braking or to unevenness in the road. When power is transmitted to the wheels, the resulting forces act more or less on the line of one of the lower springs and the upper spring, and when the brakes are applied the forces act approximately on the line between the other lower spring and the upper spring, so that the arrangement of the springs as specified tends to resist the tendency of twisting the wheel carriers with regard to the vehicle body. A similar action takes place when the vehicle is travelling over rough roads.

I claim as my invention:

1. In a motor vehicle, the combination with a body and wheels, of a carrier for each wheel and on which the wheel is journalled, rods pivoted to said carrier and to said body and forming a parallel link mechanism with each carrier and said body, springs supporting said body from said wheel carriers, a differential gear mounted on said body, and flexible driving connections between said differential gear and said wheels.

2. In a motor vehicle, the combination with a body and wheels, of a carrier for each wheel and on which the wheel is journalled, rods pivoted to said carriers and to said body and forming a parallel link mechanism with each carrier and said body, springs supporting said body from said wheel carriers, and flexible driving connections for transmitting power from said body to said wheels.

3. In a motor vehicle, the combination with a body and wheels, of a carrier for each wheel and on which the wheel is journalled, rods pivoted to said carriers and to said body and forming a parallel link mechanism with each carrier and said body, springs supporting said body from said wheel carriers, a differential gear mounted on said body, flexible driving connections between said differential gear and said wheels, and a brake also mounted on said body and acting on said driving connections.

4. In a vehicle, the combination with the wheels and body thereof, of a wheel carrier for each wheel, a plurality of springs extending transversely of said body and having their ends connected to oppositely disposed wheel carriers, said springs holding said wheel carriers in correct relation to said body under normal conditions and transmitting the weight of said body to said wheel carriers, means independent of said springs for holding said wheel carriers in correct relation to said body when the vehicle is subjected to side thrusts or the like, a differential mounted on said body portion, and flexible driving connections between said differential and said wheels.

5. In a vehicle, the combination with the wheels and body thereof, of a wheel carrier for each wheel, a plurality of springs extending transversely of said body and having their ends connected to oppositely disposed wheel carriers, said springs holding said wheel carriers in correct relation to said body under normal conditions and transmitting the weight of said body to said wheel carriers, non-load carrying means connected to said wheel carriers for holding the same in positions to support said wheels in approximately upright planes, and flexible driving connections between said body and said wheels.

6. In a motor vehicle, the combination of a body having side plates and an end plate rigidly secured together, said plates being arranged in substantially upright planes, springs extending substantially parallel to said end plate adjacent to the upper and lower parts thereof and secured thereto, wheel carriers to which the ends of said springs transmit the weight of said body, said springs transmitting the weight to said wheel carriers to portions thereof located above and below the axes of the wheels, ad ifferential supported from said end plate, and flexible driving connections between said differential and the wheels.

7. In a motor vehicle, the combination with a body and wheels, of a carrier for each wheel and on which the wheel is journalled, driving connections from said body to said wheels, and a plurality of transverse springs extending transversely of said body and secured at their intermediate portions on said body and at their ends to said wheel carriers, one of said springs being arranged above said driving connections, another spring being arranged ahead of said driving connections, and the third spring being arranged rearwardly from said driving connections.

8. In a motor vehicle, the combination with a body and wheels, of a carrier for each wheel and on which the wheel is journalled, driving connections from said body to said wheels, and a plurality of transverse springs extending transversely of said body and secured at their intermediate portions on said body and at their ends to said wheel carriers, one spring being arranged above and substantially in the same vertical plane as said driving connections and the other two springs being arranged below the level of said driving connections, one of said springs being arranged forwardly and the other spring rearwardly with reference to said driving connections.

9. In a motor vehicle, the combination with a body and wheels, of a carrier for each wheel and on which the wheel is journalled, a differential gear mounted on said body driving connections between said gear and said wheels, and three leaf springs extending transversely of said body and having their ends secured to said wheel carriers, said three springs being spaced at substantially equal distances apart about said differential gear.

10. In a motor vehicle, the combination with a body and wheels, means for supporting said body from said wheels, a differential gear mounted on said body, a housing for said differential gear having tubular projecting portions at opposite sides thereof, a pair of short shafts connected with said differential gear and journalled in said projection portions of said housing, flexible driving connections between said short shafts and said wheels, and brakes including parts mounted on said short shafts and parts mounted on said housing.

11. In a motor vehicle, the combination with a body and wheels, means for supporting said body from said wheels, a differential gear mounted on said body, a housing for said differential gear having tubular projecting portions at opposite sides thereof, a pair of short shafts connected with said differential gear and journalled in said projecting portions of said housing, flexible driving connections between said shafts and said wheels, brake drums mounted on said short shafts, expansible split rings adapted to cooperate with said brake drums and mounted on said housing, and expanding devices for said split rings, and mounted on said housing.

12. In a motor vehicle, the combination with a body and wheels, means for supporting said body from said wheels, a differential gear mounted on said body, a housing for said differential gear having tubular projecting portions at opposite sides thereof, a pair of short shafts connected with said differential gear and journalled in said projecting portions of said housing, flexible driving connections between said short shafts and said wheels, brakes including parts mounted on said short shafts and parts mounted on said differential housing, and releasing devices for said brakes which are connected with parts of said brakes and with said projecting portions of said housing.

13. In a motor vehicle, the combination of a vehicle body provided with longitudinal upright frame members, transverse frame members arranged one behind the other at the rear of said body and secured to said longitudinal members, a differential gear arranged between two of said transverse frame members and secured to one of said transverse members, wheels from which said body is supported, and connections between said differential gear and said wheels.

14. In a motor vehicle, the combination of a vehicle body provided with longitudinal frame members, transverse frame members arranged at the rear of said body and secured to said longitudinal members, a differential gear arranged between two of said transverse frame members and secured to one of said transverse members, spring-supporting members connecting said transverse members, and transversely extending springs secured to said spring supporting members.

15. In a motor vehicle, the combination of a vehicle body provided with longitudinal frame members, a pair of transverse frame members at the rear of said body and connecting said longitudinal members, a differential gear housing secured to the rear transverse member and arranged between said transverse members, tubular members connecting said transverse members, and transversely extending springs secured to said tubular members.

16. In a motor vehicle, the combination with a body and wheels, of a carrier for each wheel, a bearing on said carrier on which said wheel is journalled, a drive shaft journalled on said carrier to rotate about a fixed axis with reference to said carrier and operatively connected to said wheel, means for yieldingly connecting said carrier and said body, spacing members connecting each carrier with said body and holding said carriers in definite angular relation to said body, and a flexible connection between said shaft and said body for transmitting power to said wheel.

17. In a motor vehicle, the combination with a body and wheels, of a carrier for each wheel, an outwardly projecting portion on said carrier on which said wheel is journalled, an inwardly extending tubular projection on said carrier, spacing members connecting each carrier with said body and holding said carriers in definite angular relation to said body, a short shaft journalled in said inwardly extending projection to rotate about a fixed axis relatively to said carrier and having its outer end secured to said wheel, springs extending outwardly from said body and secured to said carrier, and a flexible connection between the inner end of said shaft and said body for transmitting power to said wheel.

18. In a motor vehicle, the combination of a body having side plates and an end plate rigidly secured together, said plates being arranged in substantially upright planes, springs extending substantially parallel to said end plate adjacent to the upper and lower parts thereof and secured thereto, wheel carriers to which the ends of said springs transmit the weight of said body, spacing members connected to said wheel carriers to hold said wheel carriers in positions in which said wheels are maintained in correct angular relations to the ground, a differential supported from said end plate, and flexible driving connections between said differential and said wheels.

19. In an automobile rear axle assembly, wheel carriers having substantially triangularly related parts, springs supported from their centers from the frame of the automobile, radius rods for each spring pivotally supported at their inner ends from the frame, and means common to the springs and radius rods to pivotally connect the outer ends of the spring and the outer ends of the radius rods to the said triangularly related parts of the wheel carriers.

20. In an automobile axle assembly, wheel carriers having substantially triangularly related parts, springs supported at their centers from the frame of the automobile, radius rods for each spring pivotally supported at their inner ends from the frame, and means to pivotally connect the outer ends of the springs and the outer ends of the radius rods to the said triangular related parts of the wheel carriers.

Witness my hand this 31st day of August, 1920.

JOSEPH S. PARENTI.

Witnesses:
F. E. PROCHNOW,
M. J. PITMAN.